United States Patent
Jiang et al.

(10) Patent No.: US 10,120,827 B2
(45) Date of Patent: Nov. 6, 2018

(54) COMMUNICATION SYSTEM WITH SERIAL PORTS FOR AUTOMATICALLY IDENTIFYING DEVICE TYPES AND COMMUNICATION PROTOCOLS AND METHOD THEREOF

(71) Applicant: VIEWMOVE TECHNOLOGIES, INC., Pingzhen, Taoyuan County (TW)

(72) Inventors: Shyh-Biau Jiang, Pingzhen (TW); Li-Wu Chen, Pingzhen (TW)

(73) Assignee: Viewmore Technologies, Inc., Pingzhen, Taoyuan County (TW)

( * ) Notice: Subject to any disclaimer, the term of this patent is extended or adjusted under 35 U.S.C. 154(b) by 180 days.

(21) Appl. No.: 15/202,978

(22) Filed: Jul. 6, 2016

(65) Prior Publication Data
US 2017/0177538 A1    Jun. 22, 2017

(30) Foreign Application Priority Data

Dec. 18, 2015  (TW) .............................. 104142852 A (51) Int. Cl.
*G06F 13/42*      (2006.01)
(52) U.S. Cl.
CPC ................................ *G06F 13/4213* (2013.01)
(58) Field of Classification Search
CPC .................................................. G06F 13/4213
See application file for complete search history.

(56) References Cited

U.S. PATENT DOCUMENTS

2006/0294272 A1   12/2006   Chou
2010/0008870 A1    1/2010   Dihora et al.
2010/0299517 A1   11/2010   Jukic et al.

FOREIGN PATENT DOCUMENTS

| TW | 200625868 A | 7/2006 |
| TW | 200921396 A | 5/2009 |
| TW | 201015332 A | 4/2010 |
| TW | 201122901 A | 7/2011 |
| TW | 201126347 A | 8/2011 |
| TW | I549497 U | 9/2016 |

*Primary Examiner* — Farley Abad
(74) *Attorney, Agent, or Firm* — Muncy, Geissler, Olds & Lowe, P.C.

(57) ABSTRACT

A communication system with serial ports for automatically identifying device types and communication protocols and method thereof are described. The communication system and method are capable of automatically identifying the device types and communication protocols of interface devices with different serial device numbers which are disposed in the serial port architecture. Furthermore, the drivers are capable of performing a serial communication based on the serial port architecture for matching the device types and communication protocols correspondingly, thereby reducing the development and manufacturing costs of communication system. Moreover, the user of an application program module only needs to provide the device numbers and data control information without the cooperation of hardware circuits and manufacturing technique of the interface devices to complete the automatic control and monitoring tasks of the interface devices to increase the utilization convenience.

20 Claims, 5 Drawing Sheets

FIG. 1

| Pin number | 1 | 2 | 3 | 4 | 5 | 6 | 7 | 8 | 9 | 10 |
|---|---|---|---|---|---|---|---|---|---|---|
| Protocol/pin assignment | Vcc | GND | Vcc | GND | TWI SCL | TWI SDA | UART TX | UART RX | SPI SCK | SPI MISO |
| Pin number | 11 | 12 | 13 | 14 | 15 | 16 | 17 | 18 | 19 | 20 |
| Protocol/pin assignment | SPI MOSI | Add /A0 | Add /A1 | Add /A2 | I/O D0 | I/O D1 | I/O D2 | I/O D3 | RW /RD | RW /WR |

COMMUNICATION SYSTEM WITH SERIAL PORTS FOR AUTOMATICALLY IDENTIFYING DEVICE TYPES AND COMMUNICATION PROTOCOLS AND METHOD THEREOF

BACKGROUND OF THE INVENTION

Field of Invention

The present invention relates to a communication system and method thereof, and more particularly to a communication system with a plurality of serial ports for automatically identifying a plurality of device types and communication protocols and method thereof.

Description of Prior Art

Although computers are widely used in a variety of application fields, the computers continue to maintain and expand the usage fields are due to the shrinkage and function development of integrated circuits. Since too many application functions are expanded to be used continuously, all the application functions cannot be added to the computer and therefore, the computer only includes basic application programs and standard expanding interfaces are provided by the computers so that the user needs to expand the interface devices of peripheral circuits based on desired different functions, which is an usual solution. The standard expanding interfaces provided by the personal computers (PCs) includes Industry Standard Architecture (ISA) protocol, Peripheral Component Interconnect (PCI) and Universal Serial Bus (USB), where ISA is a bus protocol defined by the computer, PCI is a local bus defined by peripheral devices, and USB is a serial communication interface.

Conventionally, Disk Operation System (DOS) executed in the computer provides the function of input/output (I/O) for application program developer to read/write the data from or into the circuits of the expanded interfaces, which is suitable to develop newly added applications with real-time requirement, such as feedback control, data acquisition and data broadcasting. Since the PC is the open platform architecture and provides the automatization and software engineers with a common platform to develop a variety of applications, it encourages to the common use of computers. However, the PC with the open platform architecture causes some following side effects. When a variety of application programs are executed in the same platform, it tends to cause the operation failure due to the conflict between resource usage of software and hardware, thereby resulting in unstable status of the PC. To solve the stability of computer system, Microsoft changes the operation mode of directly controlling the circuit on the expanding interface by the user. Thus, a real-time control application programs with a PC-based feature cannot be performed by general software engineers, which considerably limits the application development to the software engineers in the open platform architecture.

With the rapid development of manufacturing technique and research integrated circuit sensors, the operation capability of micro-control unit (MCU) goes beyond the core capability of micro-control unit core in the operating system of DOS. Since many micro-control units provides better high program languages, such as C language complier, more and more real-time application programs of computers are developed by MCU. However, due to the lack of standard expanding interfaces, such as PO/DOS/ISA interface protocols, the software engineers inevitably encounter the problem of hardware circuits expanding when the MCU performs newly added real-time application programs provided by the ICs. One solution is to redevelop new system with newly added ICs, which spends a lot of manufacturing costs. Another solution is that an extending flat cable is connected from newly added ICs to another circuit board, i.e. breadboard with connection points, for expanding new circuits, thereby increase the utilization inconvenience.

Consequently, there is a need to develop a communication system to solve the aforementioned problems.

SUMMARY OF THE INVENTION

One objective of the present invention is to provide a communication system with a plurality of serial ports for automatically identifying a plurality of device types and communication protocols and method thereof. The communication system with a plurality of serial ports for automatically identifying a plurality of device types and communication protocols utilizes the control unit to control the serial port architecture in order to perform an initial driver function for initializing the interface device, where the communication system is capable of automatically identifying the device types and communication protocols of the interface devices with different device numbers which are installed with the serial port architecture. The application program module and the user do not need to know the device type and communication protocol of the interface device in advance. After the device type and communication protocol of the interface device are identified, the driver functions are capable of performing a serial communication based on the serial port architecture for matching the device types and communication protocols correspondingly when the application program module communicates with the interface device via the device number using the control unit, thereby reducing the development and manufacturing costs of communication system.

Another objective of the present invention is to provide a communication system with a plurality of serial ports for automatically identifying a plurality of device types and communication protocols and method thereof. The user of an application program module only needs to provide the device numbers and data control information without the cooperation of hardware circuits and manufacturing technique of the interface devices to complete the automatic control and monitoring tasks of the interface devices to increase the utilization convenience.

According to the above objectives, the present invention sets forth a communication system with a plurality of serial ports for automatically identifying a plurality of device types and communication protocols and method thereof. The communication system includes a plurality of interface devices, configured to acquire sensing data of a plurality of peripheral devices wherein each of the interface devices includes a device number, a device type, and a communication protocol, and each of the interface devices corresponds at least one driver function; a serial port architecture coupled to the interface devices and having the serial ports, wherein the serial port architecture includes a first type communication protocol and a second type communication protocol parallel to the first type communication protocol, and the first type communication protocol is different from the second type communication protocol; a control unit coupled to the interface devices via the serial port architecture, for controlling the serial port architecture to perform an initial driver function to initialize the interface devices, wherein the control unit inquires the device types of the interface devices based on the second type communication protocol, each interface device responds the information of the device number, the device type and the communication protocol to the control unit, the control unit establishes a mapping relationship table between the device numbers, the device types, and the communication protocols according to the second type communication protocol, and the control unit stores the mapping relationship table therein; and an application program module coupled to the control unit, for transmitting a calling parameter of the device number to the control unit according to the first type communication protocol, wherein the control unit receives the calling parameter based on the first type communication protocol and searches the device type, the communication protocol, and the driver function corresponding to the device number, and the driver function of the interface device executes a data input/output (I/O) procedure to implement a serial communication procedure.

In one embodiment, each of the interface devices further includes a main functional peripheral circuit coupled to the serial port architecture, for receiving a sensing signal of the peripheral device based on the first type communication protocol; a type-identifying communication module coupled to the serial port architecture, for storing information of the device number, the device type, and a communication protocol respectively, wherein the type-identifying communication module responds the information of the device number, the device type, and the communication protocol to the control unit according to the second type communication protocol; and a reserve channel coupled to the serial port architecture and compatible to a third type communication protocol of the serial port architecture wherein the third type communication protocol is different from the first type communication protocol and the second type communication protocol.

In one embodiment, the first type communication protocol and the second type communication protocol are selected from one group consisting of Universal Asynchronous Receiver/Transmitter (UART) protocol, two-wire interface protocol, and two-wire interface protocol.

In one embodiment, the serial port architecture further includes at least one pair of power lines and at least one pair of grounding lines, for supplying power to the interface devices; a set of address lines including at least three address lines, configured to address the interface devices by the application program module via the control unit based on the set of address lines; a set of input/output lines including at least four I/O conductive lines, wherein the application program module inputs data from the control unit to the interface devices or the interface devices output the data from the control unit to the application program module based on the I/O conductive lines; and a pair of read/write control lines including a reading control line and a writing line, wherein the application program module controls read and writing statuses of the interface devices based on the pair of read/write control line using the control unit.

In one embodiment, the control unit inquires the device type of the interface device by a device number "0" based on the first type communication protocol, and the control unit further determines whether the inquired interface device makes a response to the control unit based on the first type communication protocol; wherein if the inquired interface device makes the response, the inquired interface device is a first device type with the first type communication protocol, the device number "0" is recorded as the first device type with the first type communication protocol, and the device number "0" is added by one.

In one embodiment, if the inquired interface device including the device number "0" makes no response to the control unit based on the first type communication protocol, the control unit inquires the device type of the interface device including the device number "0" and the control unit determines whether the inquired interface device makes a response to the control unit based on the second type communication protocol; wherein if the inquired interface device makes the response, the inquired interface device is a second device type with the second type communication protocol, the device number "0" is recorded as the second device type with the second type communication protocol, and the device number "0" is added by one.

In one embodiment, if the inquired interface device including the device number "0" makes no response to the control unit based on the second type communication protocol, the control unit inquires the device type of the interface device including the device number "0" and the control unit determines whether the inquired interface device makes a response to the control unit based on the third type communication protocol; wherein if the inquired interface device makes the response, the inquired interface device is a third device type with the third type communication protocol, the device number "0" is recorded as the third device type with the third type communication protocol, and the device number "0" is added by one.

In one embodiment, if the inquired interface device including the device number "0" makes no response to the control unit based on the third type communication protocol, the device number "0" is added by one.

In one embodiment, when the device number is smaller than a predetermined number, the control unit inquires the device type of the interface device including a device number "1" based on the first type communication protocol and determines whether the inquired interface device makes a response to the control unit based on the first type communication protocol until the control unit inquires the device types and corresponding communication protocols of all the interface devices at different device numbers.

In one embodiment, the interface devices with the first device type, the second device type and the third device type are selected from one group consisting of an analog-digital converter (ADC) interface device, a digital-analog converter (DAC) interface device, and a digital input/output device (DIO).

In one embodiment, the calling parameter is selected from one group consisting of an I/O data length, an I/O flag mask, a shift value, a flag value and the combination.

In the present embodiment, a communication method with serial ports for automatically identifying device types and communication protocols, the communication method including the steps of ((S1) controlling a serial port architecture to perform an initial driver function to initialize a plurality of interface devices by a control unit, wherein the serial port architecture includes a first type communication protocol and a second type communication protocol parallel to the first type communication protocol, and the first type communication protocol is different from the second type communication protocol, the initialization step further including the steps (S11) inquiring a plurality of device types of the interface devices based on the second type communication protocol by the control unit, wherein each of the interface devices includes a device number, a device type, and a communication protocol, and each of the interface devices corresponds at least one driver function; (S12) based on the device types, responding information of the device type to the control unit according to the second type communication protocol by a type-identifying communication module of each interface device; and (S13) based on the device types, establishing a mapping relationship table between the device numbers, the device types, and the communication protocols according to the second type communication protocol by the control unit, and the control unit stores the mapping relationship table therein; ((S2) transmitting a calling parameter of the device number to the control unit according to the first type communication protocol by the application program module coupled to the control unit; and ((S3) receiving the calling parameter based on the first type communication protocol and searching the device type, the communication protocol, and the driver function corresponding to the device number by the control unit so that the driver function of the interface device executes a data input/output (I/O) procedure to implement a serial communication procedure.

In one embodiment, the control unit inquires the device type of the interface device by a device number "0" based on the first type communication protocol, and the control unit further determines whether the inquired interface device makes a response to the control unit based on the first type communication protocol; wherein if the inquired interface device makes the response, the inquired interface device is a first device type with the first type communication protocol, the device number "0" is recorded as the first device type with the first type communication protocol, and the device number "0" is added by one.

In one embodiment, during the steps (S11) and (S12), if the inquired interface device including the device number "0" makes no response to the control unit based on the first type communication protocol, the control unit inquires the device type of the interface device including the device number "0" and the control unit determines whether the inquired interface device makes a response to the control unit based on the second type communication protocol; wherein if the inquired interface device makes the response, the inquired interface device is a second device type with the second type communication protocol, the device number "0" is recorded as the second device type with the second type communication protocol, and the device number "0" is added by one.

In one embodiment, during the steps (S11) and (S12), if the inquired interface device including the device number "0" makes no response to the control unit based on the second type communication protocol, the control unit inquires the device type of the interface device including the device number "0" and the control unit determines whether the inquired interface device makes a response to the control unit based on the third type communication protocol; wherein if the inquired interface device makes the response, the inquired interface device is a third device type with the third type communication protocol, the device number "0" is recorded as the third device type with the third type communication protocol, and the device number "0" is added by one.

In one embodiment, during the steps (S11) and (S12), if the inquired interface device including the device number "0" makes no response to the control unit based on the third type communication protocol, the device number "0" is added by one.

In one embodiment, during the steps (S11) and (S12), when the device number is smaller than a predetermined number, the control unit inquires the device type of the interface device including a device number "1" based on the first type communication protocol and determines whether the inquired interface device makes a response to the control unit based on the first type communication protocol until the control unit inquires the device types and corresponding communication protocols of all the interface devices at different device numbers.

In one embodiment, the control unit further includes a driver library coupled to the mapping relationship table, for storing the driver functions and the initial driver function in the driver library.

In one embodiment, the first type communication protocol and the second type communication protocol are selected from one group consisting of Universal Asynchronous Receiver/Transmitter (UART) protocol, two-wire interface protocol, and two-wire interface protocol.

In one embodiment, the calling parameter is selected from one group consisting of an I/O data length, an I/O flag mask, a shift value, a flag value and the combination.

In the present invention, a computing device includes a computer readable media and a processor, wherein the computer readable media stores therein at least one application program, the computing device executes the at least one application program using the processor, and the computing device performs a method including ((S1) controlling a serial port architecture to perform an initial driver function to initialize a plurality of interface devices by the processor, wherein the serial port architecture comprises a first type communication protocol and a second type communication protocol parallel to the first type communication protocol, and the first type communication protocol is different from the second type communication protocol, the initialization step further comprising the steps (S11) inquiring a plurality of device types of the interface devices based on the second type communication protocol by the processor, wherein each of the interface devices comprises a device number, a device type, and a communication protocol, and each of the interface devices corresponds at least one driver function; (S12) based on the device types, responding information of the device type to the processor according to the second type communication protocol by a type-identifying communication module of each interface device; and (S13) based on the device types, establishing a mapping relationship table between the device numbers, the device types, and the communication protocols according to the second type communication protocol by the processor, and the processor stores the mapping relationship table therein; ((S2) transmitting a calling parameter of the device number to the processor according to the first type communication protocol by the application program module coupled to the processor; and ((S3) receiving the calling parameter based on the first type communication protocol and searching the device type, the communication protocol, and the driver function corresponding to the device number by the processor so that the driver function of the interface device executes a data input/output (I/O) procedure to implement a serial communication procedure.

DETAILED DESCRIPTION OF THE PREFERRED EMBODIMENTS

Figure 1:
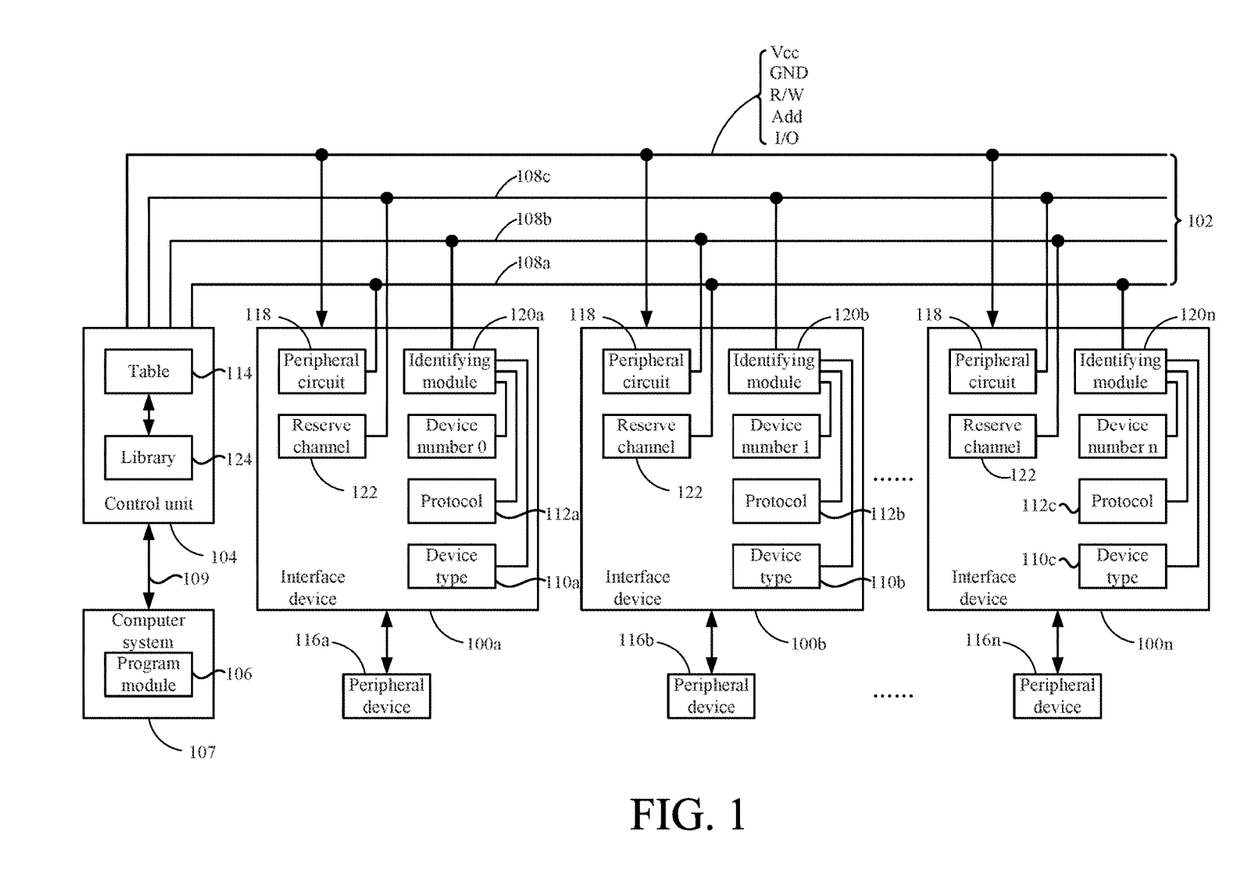
FIG. 1 is a schematic block diagram of a communication system with serial ports for automatically identifying device types and communication protocols according to one embodiment of the present invention.

FIG. 1 is a schematic block diagram of a communication system with serial ports for automatically identifying device types and communication protocols according to one embodiment of the present invention. The communication system with serial ports for automatically identifying device types and communication protocols includes a plurality of interface devices 100a, 100b, . . . , and 100n, a serial port architecture 102 with multiple ports, a control unit 104 such as a processor, and an application program module 106. The serial port architecture 102 is coupled between the interface devices 100a, 100b, . . . , and 100n and control unit 104 where each of the interface devices 100a, 100b, . . . , and 100n is coupled to each of a plurality of peripheral devices 116a, 116b, . . . , and 116n correspondingly, such as temperature sensors, pressure sensors and motors. The application program module 106 couples to the control unit 104 by a communication link 109 and is disposed in a computer system 107 or a computing device (not shown) so that the application programs executed in the application program module 106 are capable of performing serial communications, control operations and monitoring procedures to the peripheral devices 116a, 116b, . . . , and 116n coupled to the interface devices 100a, 100b, . . . , and 100n by using the control unit 104. In the present invention, the control unit 104, such as micro-control unit, with a variety of serial communication port interface is adapted to the serial port architecture 102 to support automatic control and monitoring procedure between the serial port architecture 102 and interface devices 100a, 100b, . . . , and 100n.

As shown in FIG. 1, the interface devices 100a, 100b, . . . , and 100n are configured to acquire or receive the sensing data of the peripheral devices 116a, 116b, . . . , and 116n where each of interface devices 100a, 100b, . . . , and 100n includes a device number 0, 1, . . . , and n, a device type 110a, 110b and 110c, and a communication protocol 112a, 112b and 112c. Each of interface devices 100a, 100b, . . . , and 100n corresponds at least one driver function where the driver includes a set of instructions and/or application program codes stored in a computer storing media to be executed by a processor of a computing device. In one embodiment, the interface devices 100a, 100b, . . . , and 100n including a first device type 110a, a second device type 110b and a third device type 110c respectively are selected from one group including an analog-digital converter (ADC) interface device, a digital-analog converter (DAC) interface device, and a digital input/output device (DIO), but not limited to the above device. The interface devices 100a, 100b, . . . , and 100n can be data acquisition interface card.

Figure 2:
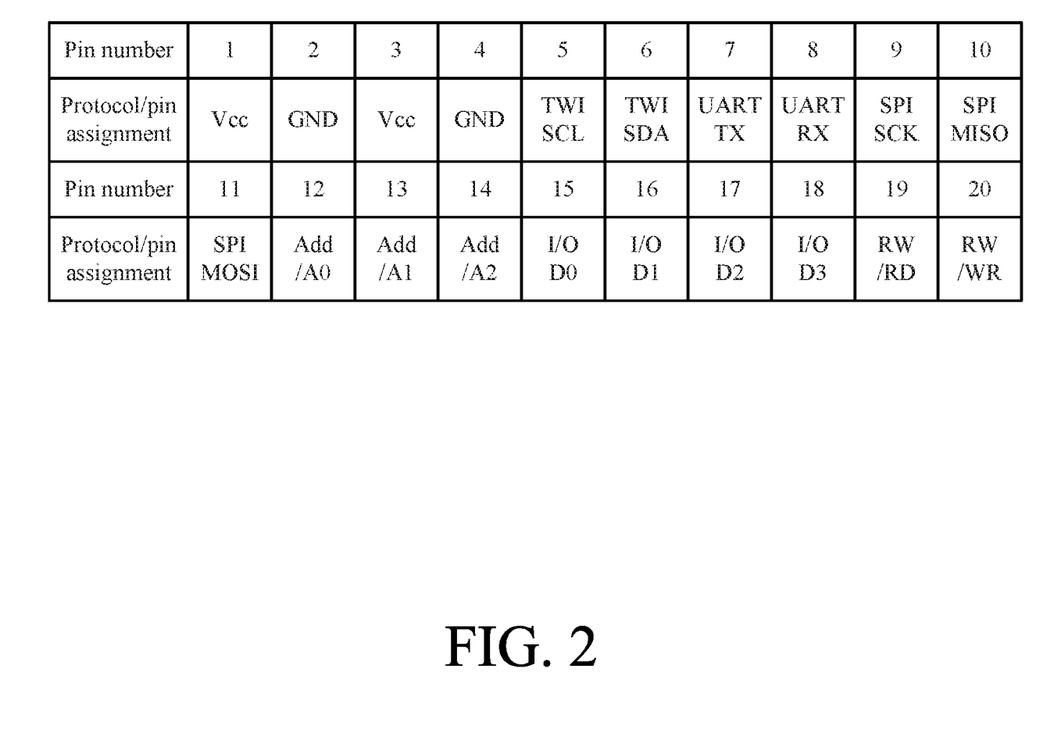
FIG. 2 is a signal pin assignment table of an architecture with a plurality of serial ports according to one embodiment of the present invention.

FIG. 2 is a signal pin assignment table of the architecture 102 with a plurality of serial ports according to one embodiment of the present invention. Each of interface devices 100a, 100b, . . . , and 100n further includes a main circuit, a type-identifying communication module 120a, 120b, . . . , and 120n, and a reserve channel 122. The main functional peripheral circuit 118 is coupled to the serial port architecture 102 and receives the sensing signal of the peripheral devices 116a, 116b, . . . , and 116n based on a first type communication protocol 108a. The type-identifying communication module 120a, 120b, . . . , and 120n is coupled to the serial port architecture 102 stores the information of the device number 0, 1, . . . , and n, a device type 110a, 110b and 110c, and a communication protocol 112a, 112b and 112c respectively and responds the information of the device number 0, 1, . . . , and n, a device type 110a, 110b and 110c, and a communication protocol 112a, 112b and 112c to the control unit 104 according to a second type communication protocol 108b. The reserve channel 122 is coupled to the serial port architecture 102 and compatible to a third type communication protocol 108c of the serial port architecture 102 where the third type communication protocol 108c is different from the first type communication protocol 108a or second type communication protocol 108b. In one embodiment, the first type communication protocol 108a, second type communication protocol 108b and third type communication protocol 108c are selected from the communication protocols of Universal Asynchronous Receiver/Transmitter (UART), two-wire interface, and three-wire interface. For an example of FIG. 1, the interface device 100a supports UART of the first type communication protocol 108a, the interface device 100b supports two-wire interface of the second type communication protocol 108b, and the interface device 100c supports three-wire interface of the third type communication protocol 108c. UART of the first type communication protocol 108a includes a receiving line RX and a transmitting line TX, as shown in pin numbers 7 to 8 in FIG. 2. The two-wire interface of the second type communication protocol 108b includes a clock line SCL and a data line SDA, as shown in pin numbers 5 to 6 in FIG. 2. The three-wire interface of the third type communication protocol 108c includes a clock line SCLK, a master input slave output line MISO, and a master output slave input line MOSI, as shown in pin numbers 9 to 11 in FIG. 2 where the three-wire interface is defined as a serial peripheral interface (SPI).

Refer to FIGS. 1 and 2. In FIG. 1, the serial port architecture 102 is coupled to the interface devices 100a, 100b, . . . , and 100n and includes the first type communication protocol 108a and second type communication protocol 108b parallel to the first type communication protocol 108a where the first type communication protocol 108a is different from the second type communication protocol 108b. In FIG. 2, the serial port architecture 102 further includes at least one pair of power lines Vcc and at least one pair of grounding lines GND, a set of address lines Add, a set of input/output lines I/O, and a pair of read/write control lines RW. In one embodiment, the serial port architecture 102 of the present invention includes three types of communication protocols which have twenty signal lines to form compatible communication wires with physical layer between the control unit 104 and the interface devices 100a, 100b, . . . , and 100n. For example, the compatible communication wires with physical layer is formed by a flat ribbon cable with twenty conductive wires at an interval distance 20 mm between every two wires, but not limited to the distance. In one embodiment of FIG. 2, a pair of power lines Vcc and a pair of grounding lines GND defined by pin numbers 1 to 4 supply power to the interface devices 100a, 100b, . . . , and 100n. At lest three address lines /A0 to /A2 are configured to address the interface devices 100a, 100b, . . . , and 100n by the application program module 106 via the control unit 104 based on the set of address lines Add. Preferably, the set of address lines Add is configured to assign an addressing capability to the communication protocol of three-wire interface. In one embodiment of FIG. 2, pin numbers 15 to 18 depict at least four I/O conductive lines D0 to D3 respectively. The application program module 106 inputs data from the control unit 104 to the interface devices 100a, 100b, . . . , and 100n, or the interface devices 100a, 100b, . . . , and 100n output the data from the control unit 104 to the application program module 106 based on I/O conductive lines D0 to D3. In one embodiment of FIG. 2, pin numbers 19 to 20 depict a reading control line /RD and a writing line /WR. The application program module 106 controls the read and writing statuses of the interface devices 100a, 100b, . . . , and 100n based on the pair of read/write control line RW using the control unit 104.

The serial port architecture 102 is configured to couple the interface devices 100a, 100b, . . . , and 100n with different main functional peripheral circuits 118 at daisy chain manner. No matter which one of the above-mentioned three communication protocols in the main functional peripheral circuits 118 are adapted by the interface devices 100a, 100b, . . . , and 100n, a serial communication can be executed between the interface devices 100a, 100b, . . . , and 100n and the control unit 104 when the serial port architecture 102 connects the interface devices 100a, 100b, . . . , and 100n to the control unit 104. Since the serial port architecture 102 supports at least three communication protocols and each interface device 100a, 100b, . . . , and 100n only utilizes one communication protocol where at least two communication protocols are idle in interface devices, the type-identifying communication module 120a, 120b, . . . , and 120n is able to communicate with the control unit 104 to report the device type 110a, 110b and 110c using the at least two idle communication protocols. In one embodiment, the type-identifying communication module 120a of the interface device 100a configures the second and third communication protocols 108b, 108c to report the device type 110a and communication protocol 112a. The type-identifying communication module 120b of the interface device 100b configures the first and third communication protocols 108a, 108c to report the device type 110b and communication protocol 112b. The type-identifying communication module 120n of the interface device 100n is used to configure the first and second communication protocols 108a, 108b to report the device type 110n and communication protocol 112n.

In FIG. 1, the control unit 104 couples the serial port architecture 102 to the interface device 100a, 100b, . . . , and 100n so that the serial port architecture 102 performs an initial driver function to initialize the interface devices 100a, 100b, . . . , and 100n. The control unit 104 inquires the device type 110a, 110b and 110c of interface devices 100a, 100b, . . . , and 100n based on the first type communication protocol 108a, second type communication protocol 108b and third type communication protocol 108c so that each interface device 100a, 100b, . . . , and 100n responds the information of the device number 0, 1, . . . , and n, the device type 110a, 110b and 110c, and the communication protocol 112a, 112b and 112c to the control unit 104. The control unit 104 establishes a mapping relationship table 114 between the device number 0, 1, . . . , and n, the device type 110a, 110b and 110c, and the communication protocol 112a, 112b and 112c according to the first type communication protocol 108a, second type communication protocol 108b and third type communication protocol 108c and the control unit 104 stores the mapping relationship table 114 therein. In one embodiment, the control unit 104 includes a driver library 124 coupled to the mapping relationship table 114 for storing the driver functions and the initialization driver functions in the driver library 124. The mapping relationship table 114 is listed below.

| device number | device type | communication protocol | driver function |
| --- | --- | --- | --- |
| 0 | ADC device | UART | ADC driver |
| 1 | DAC device | two-wire interface | DAC driver |
| . | . | . | . |
| . | . | . | . |
| . | . | . | . |
| n | DIO device | three-wire interface | DIO driver |

In FIG. 1, the application program module 106 coupled to the control unit 104 is configured to transmit the calling parameters of the device numbers 0, 1, . . . , and n to the control unit 104 according to the first type communication protocol 108a, second type communication protocol 108b and third type communication protocol 108c. Thus, the control unit 104 receives the calling parameters based on the first type communication protocol 108a, second type communication protocol 108b and third type communication protocol 108c and searches the device type 110a, 110b and 110c, the communication protocol 112a, 112b and 112c, and the driver functions corresponding to the device number 0, 1, . . . , and n in the mapping relationship table 114 so that the driver functions of the interface devices 100a, 100b, . . . , and 100n execute the I/O procedure of data and control signals, such as commands or instructions, to implement the serial communication procedure.

The control unit 104 transmits the device numbers, which are issued by the application program module 106, to the corresponding interface devices 100a, 100b, . . . , and 100n. For an example of third type communication protocol 108c of the three-wire communication protocol, the control unit 104 determines the device number of the serial communication based on the received calling parameters. The control unit 104 sends the device number to the interface device, such as the interface device 100n, via the address line Add of the serial port architecture 102. In one embodiment, when the interface device 100n matches the device number itself with the sent device number, the interface device 100n generates an actuating signal to enable the main functional peripheral circuit 118 of interface device 100n such that the interface device 100n serially communicates with the control unit 104 using three-wire interface of third type communication protocol 108c. According to the above-mentioned descriptions, the three-wire interface is integrated with the address line Add for assigning an addressing capability to the three-wire interface to solve the problem of conventional three-wire interface without the addressing rules.

In another embodiment, the control unit 104 controls the interface device 100n to perform four-bit outputting procedure. The interface device 100n controls a tri-state component (not shown) to communicate the control unit 104 with the interface device 100n by using four I/O conductive lines and the read/write control lines RW. In the above embodiment, when the control unit 104 controls the interface device 100n to perform four-bit outputting procedure and the link between the control unit 104 and the interface device 100n is activated, the control unit 104 transmits the outputting signal to the interface device 100n by the four I/O conductive lines. The control unit 104 controls the read/write control lines RW to generate a rising edge signal and falling edge signal so that the interface device 100n latches the signals on the four I/O conductive lines into the registers (not shown) of the interface device 100*n* and stores the latched signals to the register.

In one embodiment, the calling parameter further includes an I/O data length, an I/O flag mask, a shift value, a flag value and the combination. For an example of seven-segment display unit, the driver function of seven-segment display unit can be configured as follow: Char ASA_7S00_set (char ASA_ID, char LSByte, char Mask, char shift, char Data), where "Char ASA_7S00_set" indicates the variable, "char ASA_ID" indicates the device number, "char LSByte" indicates the I/O data length, "char Mask" indicates the I/O flag mask, "char shift" indicates the sift value, and "char Data" indicates the I/O data. The control unit 104 uses the function syntax of driver function to acquire the driver function "Char ASA_7S00_set( )" and the pointer of the driver function "Char ASA_7S00_set( )" in the driver library 124. The pointer of driver function is stored in function matrix based on the device numbers 0, 1, . . . , and n. When the application program module 106 assigns the device number as the calling parameter, the control unit 104 calls the corresponding driver function and acquires the pointer corresponding to the driver function in the function matrix according to the device number. Furthermore, the control unit 104 provides a transmission calling parameter of the driver function from the application program module 106 to serve as a transmission calling parameter of the function pointer for executing the driver function which is pointed by the function pointer.

In the present invention, after the communication system is booting and before the driver functions are called, the control unit 104 performs the initial procedure of driver functions and calls the interface devices 100*a*, 100*b*, . . . , and 100*n* by using the three type communication protocols for inquiring the device type of the interface devices with different device numbers coupled to the communication ports. Since the type-identifying communication module 120*a*, 120*b*, . . . , and 120*n* is capable of reporting the device type 110*a*, 110*b* and 110*c* and the communication protocol 112*a*, 112*b* and 112*c*, the interface device 100*a*, 100*b*, . . . , and 100*n* is able to control acquisition and transmission of the data of the peripheral devices 116*a*, 116*b* by the matched communication protocol 112*a*, 112*b* and 112*c* and communication programs after the control unit 104 receives the reported the device type 110*a*, 110*b* and 110*c* and the communication protocol 112*a*, 112*b* and 112*c*.

According to the aforementioned descriptions, the communication system with a plurality of serial ports for automatically identifying a plurality of device types and communication protocols utilizes the control unit 104 to control the serial port architecture 102 in order to perform an initial driver function for initializing the interface device 100*a*, 100*b*, . . . , and 100*n*, where the communication system is capable of automatically identifying the device types and communication protocols of the interface devices with different device numbers which are installed with the serial port architecture 102. The application program module 106 and the user do not need to know the device type and communication protocol of the interface device in advance. After the device type and communication protocol of the interface device are identified, the driver functions are capable of performing a serial communication based on the serial port architecture for matching the device types and communication protocols correspondingly when the application program module 106 communicates with the interface device via the device number using the control unit, thereby reducing the development and manufacturing costs of communication system.

Figure 3:
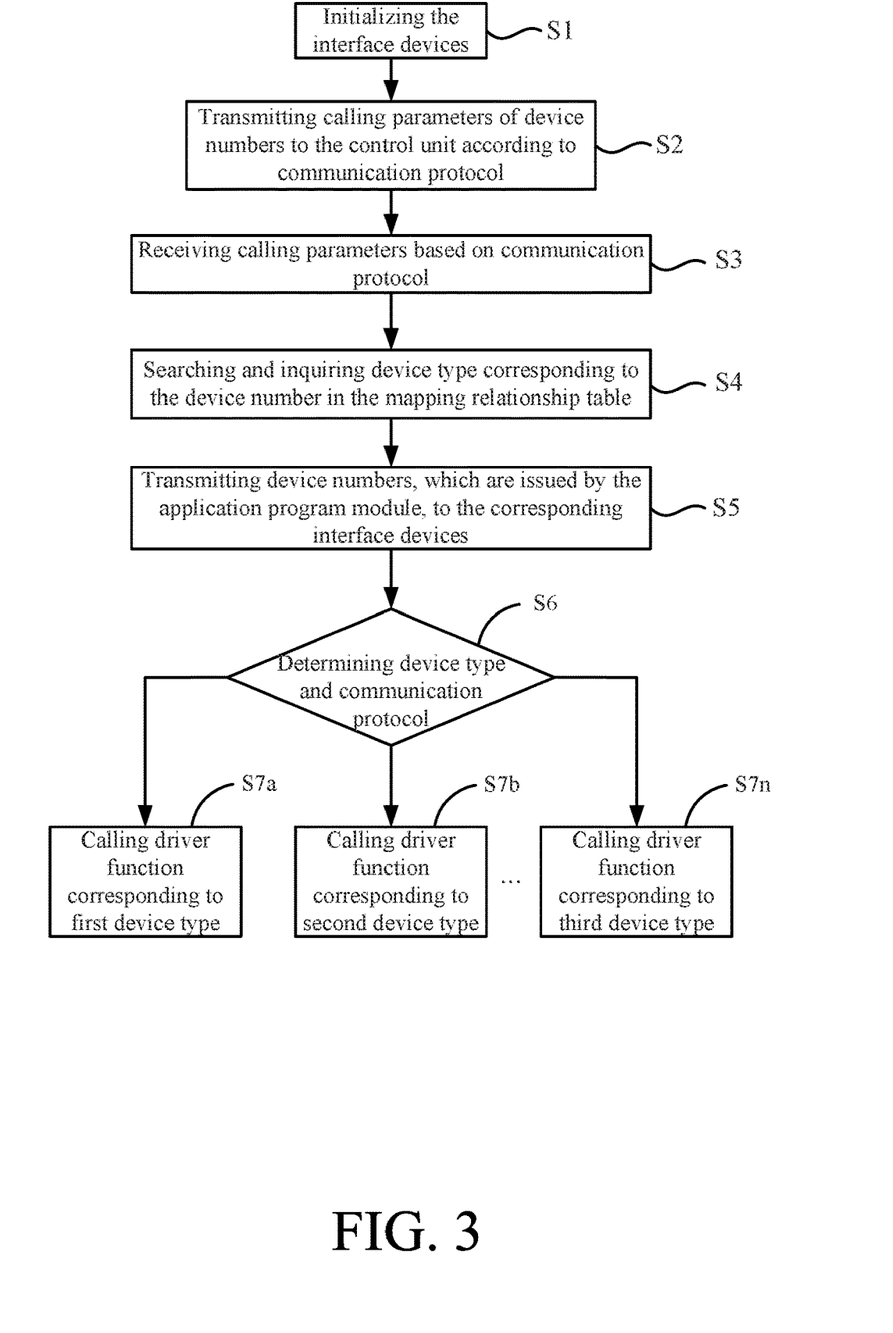
FIG. 3 is a flowchart of performing a communication method with the serial ports for automatically identifying the device types and communication protocols according to one embodiment of the present invention.

Refer to FIGS. 1 to 3. FIG. 3 is a flowchart of performing a communication method with the serial ports for automatically identifying the device types and communication protocols according to one embodiment of the present invention. The communication method includes the following steps.

In step S1 of FIG. 3, the control unit 104 controls the serial port architecture 102 to perform an initial procedure of the driver function for initializing the interface devices 100*a*, 100*b*, . . . , and 100*n* where the serial port architecture 102 includes the first type communication protocol 108*a*, a second type communication protocol 108*b* parallel to the first type communication protocol 108*a*, and a third type communication protocol 108*c* parallel to the first type communication protocol 108*a* and second type communication protocol 108*b*. The first type communication protocol 108*a*, second type communication protocol 108*b*, and third type communication protocol 108*c* are mutually different. The initialization procedure includes the following steps.

Figure 4:
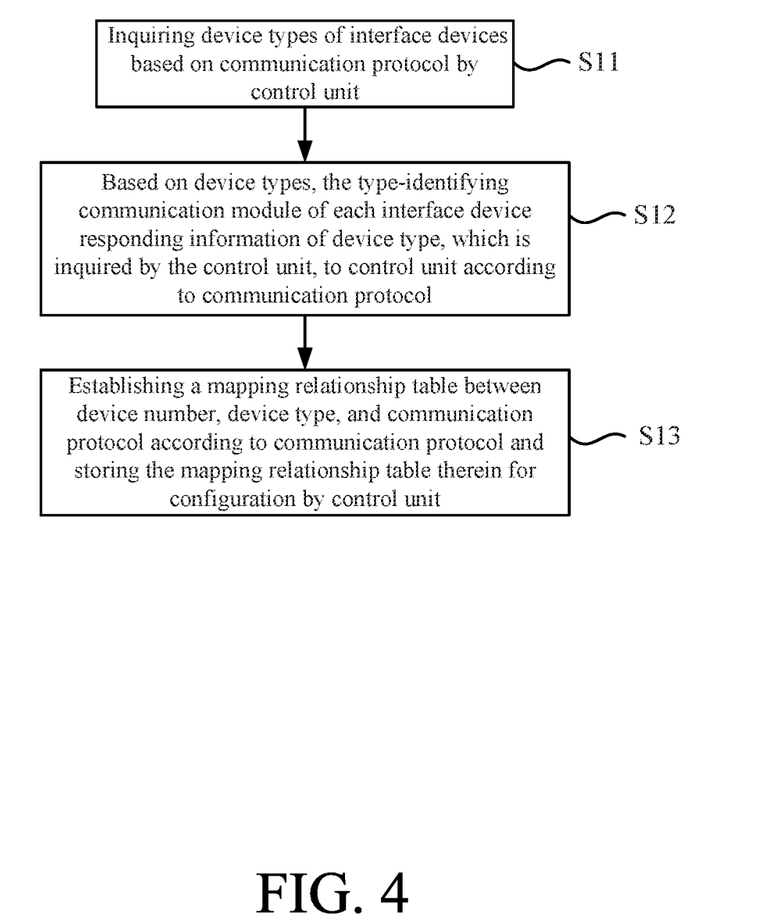
FIG. 4 is a flowchart of an initialization procedure of the communication method with the serial ports according to one embodiment of the present invention.

FIG. 4 is a flowchart of an initialization procedure of the communication method with the serial ports according to one embodiment of the present invention. In step S11, the control unit 104 inquires the device type 110*a*, 110*b* and 110*c* of interface devices 100*a*, 100*b*, . . . , and 100*n* based on the first type communication protocol 108*a*, second type communication protocol 108*b* and third type communication protocol 108*c*, where each of interface devices 100*a*, 100*b*, . . . , and 100*n* includes a device number 0, 1, . . . , and n, the device type 110*a*, 110*b* and 110*c*, and the communication protocol 112*a*, 112*b* and 112*c*, and corresponds to a driver function. In step S12, based on the device types, the type-identifying communication module 120*a*, 120*b*, . . . , and 120*n* of each interface device 100*a*, 100*b*, . . . , and 100*n* responds the information of a device type, which is inquired by the control unit 104, to the control unit 104 according to the first type communication protocol 108*a*, second type communication protocol 108*b* and third type communication protocol 108*c*. In step S13, the control unit 104 establishes a mapping relationship table 114 between the device number 0, 1, . . . , and n, the device type 110*a*, 110*b* and 110*c*, and the communication protocol 112*a*, 112*b* and 112*c* according to the first type communication protocol 108*a*, second type communication protocol 108*b* and third type communication protocol 108*c* and the control unit 104 stores the mapping relationship table 114 therein for configuration.

In step S2 of FIG. 3, the application program module 106 transmits the calling parameters of the device numbers 0, 1, . . . , and n to the control unit 104 according to the first type communication protocol 108*a*, second type communication protocol 108*b* and third type communication protocol 108*c*.

In step S3 of FIG. 3, the control unit 104 receives the calling parameters based on the first type communication protocol 108*a*, second type communication protocol 108*b* and third type communication protocol 108*c* where the calling parameters includes device number.

In step S4 of FIG. 3, the control unit 104 searches and inquires the device type 110*a*, 110*b* and 110*c*, the communication protocol 112*a*, 112*b* and 112*c*, and the driver functions corresponding to the device number 0, 1, . . . , and n in the mapping relationship table 114

In step S5 of FIG. 3, the control unit 104 transmits the device numbers, which are issued by the application program module 106, to the corresponding interface devices 100*a*, 100*b*, . . . , and 100*n*. For an example of third type communication protocol 108c of the three-wire communication protocol, the control unit 104 determines the device number of the serial communication based on the received calling parameters. The control unit 104 sends the device number to the interface device, such as the interface device 100n, via the address line Add of the serial port architecture 102.

In step S6 of FIG. 3, the control unit 104 determines the device type 110a, 110b and 110c and the communication protocol 112a, 112b and 112c. In one embodiment, when the interface device 100n matches the device number itself with the sent device number, the interface device 100n generates an actuating signal to enable the main functional peripheral circuit 118 of interface device 100n such that the interface device 100n serially communicates with the control unit 104 using three-wire interface of third type communication protocol 108c. In another embodiment, the control unit 104 controls the interface device 100n to perform four-bit outputting procedure. The interface device 100n controls a tri-state component (not shown) to communicate the control unit 104 with the interface device 100n by using four I/O conductive lines and the read/write control lines RW.

In steps S7a to S7n of FIG. 3, the control unit 104 calls the driver function corresponding to the device type 110a, 110b and 110c to execute the input/output (I/O) step by using the called driver function. In the above embodiment, when the control unit 104 controls the interface device 100n to perform four-bit outputting procedure and the link between the control unit 104 and the interface device 100n is activated, the control unit 104 transmits the outputting signal to the interface device 100n by the four I/O conductive lines. The control unit 104 controls the read/write control lines RW to generate a rising edge signal and falling edge signal so that the interface device 100n latches the signals on the four I/O conductive lines into the registers (not shown) of the interface device 100n and stores the latched signals to the register.

Figure 5:
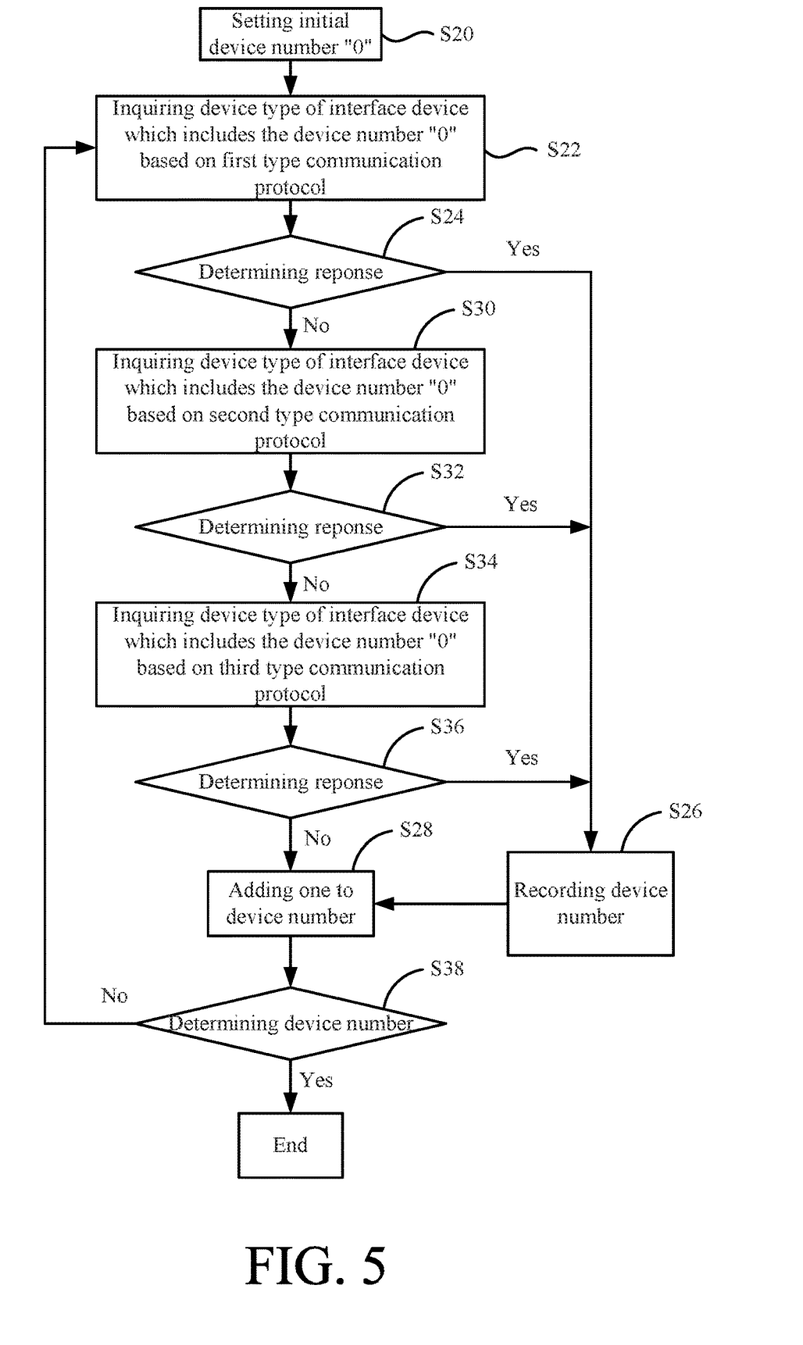
FIG. 5 is a flowchart of polling each of interface devices with a device number in a serial port architecture using a control unit according to one embodiment of the present invention.

Refer to FIGS. 4 and 5. FIG. 5 is a flowchart of polling each of interface devices 100a, 100b, . . . , and 100n with a device number 0, 1, . . . , and n in a serial port architecture 102 using a control unit 104 according to one embodiment of the present invention. The steps S11 and S12 in FIG. 4 further include the following steps.

In step S20 of FIG. 5, the control unit 104 sets an initial device number as "0". In one embodiment, the device number is selected from an arbitrary integer, such as 0, 1, . . . , and n, where n is a positive integer, each integer is unique, and the initial device number is one of the integers. In step S22, the control unit 104 inquires the device type of the interface device 100a, 100b, . . . , and 100n which includes the device number "0" based on the first type communication protocol. In step S24, the control unit 104 determines whether the inquired interface device makes a response to the control unit 104 based on the first type communication protocol. If yes, the inquired interface device is a first device type with the first type communication protocol. In step S26, the device number "0" is recorded as the first device type with the first type communication protocol. In step S28, the device number is added by one. In step S38, the control unit 104 determines whether the added device number exceeds a predetermined number. If no, return step S22. If yes, end the flowchart.

In step S24 of FIG. 5, if the inquired interface device including the device number "0" makes no response to the control unit 104 based on the first type communication protocol, proceed to step S30. In step S30, the control unit 104 inquires the device type of the interface device 100a, 100b, . . . , and 100n which includes the device number "0" based on the second type communication protocol. In step S32, the control unit 104 determines whether the inquired interface device makes a response to the control unit 104 based on the second type communication protocol. If yes, the inquired interface device is a second device type with the second type communication protocol. In step S26, the device number "0" is recorded as the second device type with the second type communication protocol. In step S28, the device number is added by one. In step S38, the control unit 104 determines whether the added device number exceeds the predetermined number. If no, return step S22. If yes, end the flowchart.

In step S32 of FIG. 5, if the inquired interface device including the device number "0" makes no response to the control unit 104 based on the second type communication protocol, proceed to step S34. In step S34, the control unit 104 inquires the device type of the interface device 100a, 100b, . . . , and 100n which includes the device number "0" based on the third type communication protocol. In step S36, the control unit 104 determines whether the inquired interface device makes a response to the control unit 104 based on the third type communication protocol. If yes, the inquired interface device is the third device type with the third type communication protocol. In step S26, the device number "0" is recorded as the third device type with the third type communication protocol. In step S28, the device number is added by one. In step S38, the control unit 104 determines whether the added device number exceeds the predetermined number. If no, return step S22. If yes, end the flowchart.

In step S36 of FIG. 5, if the inquired interface device including the device number "0" makes no response to the control unit 104 based on the third type communication protocol, proceed to step S28. In step S28, the device number is added by one.

In step S38 of FIG. 5, the control unit 104 determines whether the added device number exceeds the predetermined number. If no, return step S22. If yes, end the flowchart. In other words, when the device number is smaller than or equal to the predetermined number, the control unit 104 inquires the device type of the interface device 100a, 100b, . . . , and 100n which includes the device number "1" based on the first type communication protocol, and the control unit 104 determines whether the inquired interface device makes a response to the control unit 104 based on the first type communication protocol until the control unit 104 inquires the device type and the corresponding communication protocol of all the interface devices 100a, 100b, . . . , and 100n at different device numbers, such as 0, 1, . . . , and n. If the added device number exceeds the predetermined number, end the flowchart.

In one embodiment, when the interface devices 100a, 100b, . . . , and 100n are increased and the different interface devices with similar driver function and I/O are used, the user carelessly selects wrong driver function, which can be solved by polling the device numbers in the flowchart of FIG. 5.

According to the above-mentioned descriptions, in the communication system with serial ports for automatically identifying device types and communication protocols and method thereof, the user of an application program module only needs to provide the device numbers and data control information without the cooperation of hardware circuits and manufacturing technique of the interface devices to complete the automatic control and monitoring tasks of the interface devices to increase the utilization convenience.

The serial port architecture focuses on the computer system providing the standard expanding interfaces and interface devices are inserted to the standard expanding interfaces correspondingly to communicate with the computer system. Furthermore, a plurality of driver functions of the interface devices are provided so that the application program module calls or invokes the driver functions to conveniently configure the function of newly insert interface devices for effectively expanding the application field of the computer system.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structure.

What is claimed is:

1. A communication system with serial ports for automatically identifying device types and communication protocols, the communication system comprising:
    a plurality of interface devices, configured to acquire sensing data of a plurality of peripheral devices wherein each of the interface devices comprises a device number, a device type, and a communication protocol, and each of the interface devices corresponds to at least one driver function;
    a serial port architecture coupled to the interface devices and having the serial ports, wherein the serial port architecture comprises a first type communication protocol and a second type communication protocol parallel to the first type communication protocol, and the first type communication protocol is different from the second type communication protocol;
    a control unit coupled to the interface devices via the serial port architecture, for controlling the serial port architecture to perform an initial driver function to initialize the interface devices, wherein the control unit inquires the device types of the interface devices based on the second type communication protocol, each interface device responds with the information of the device number, the device type and the communication protocol to the control unit, the control unit establishes a mapping relationship table between the device numbers, the device types, and the communication protocols according to the second type communication protocol, and the control unit stores the mapping relationship table therein; and
    an application program module coupled to the control unit, for transmitting a calling parameter of the device number to the control unit according to the first type communication protocol, wherein the control unit receives the calling parameter based on the first type communication protocol and searches the device type, the communication protocol, and the driver function corresponding to the device number, and the driver function of the interface device executes a data input/output (I/O) procedure to implement a serial communication procedure.

2. The communication system with serial ports of claim 1, wherein each of the interface devices further comprises:
    a main functional peripheral circuit coupled to the serial port architecture, for receiving a sensing signal of the peripheral device based on the first type communication protocol;
    a type-identifying communication module coupled to the serial port architecture, for storing information of the device number, the device type, and a communication protocol respectively, wherein the type-identifying communication module responds with the information of the device number, the device type, and the communication protocol to the control unit according to the second type communication protocol; and
    a reserve channel coupled to the serial port architecture and compatible to a third type communication protocol of the serial port architecture wherein the third type communication protocol is different from the first type communication protocol and the second type communication protocol.

3. The communication system with serial ports of claim 1, wherein the first type communication protocol and the second type communication protocol are selected from one group consisting of Universal Asynchronous Receiver/Transmitter (UART) protocol, two-wire interface protocol, and two-wire interface protocol.

4. The communication system with serial ports of claim 1, wherein the serial port architecture further comprises:
    at least one pair of power lines and at least one pair of grounding lines, for supplying power to the interface devices;
    a set of address lines comprising at least three address lines, configured to address the interface devices by the application program module via the control unit based on the set of address lines;
    a set of input/output lines comprising at least four I/O conductive lines, wherein the application program module inputs data from the control unit to the interface devices or the interface devices output the data from the control unit to the application program module based on the I/O conductive lines; and
    a pair of read/write control lines comprising a reading control line and a writing line, wherein the application program module controls read and writing statuses of the interface devices based on the pair of read/write control line using the control unit.

5. The communication system with serial ports of claim 1, wherein the control unit inquires the device type of the interface device by a device number "0" based on the first type communication protocol, and the control unit further determines whether the inquired interface device makes a response to the control unit based on the first type communication protocol;
    wherein if the inquired interface device makes the response, the inquired interface device is a first device type with the first type communication protocol, the device number "0" is recorded as the first device type with the first type communication protocol, and the device number "0" is added by one.

6. The communication system with serial ports of claim 5, wherein if the inquired interface device comprising the device number "0" makes no response to the control unit based on the first type communication protocol, the control unit inquires the device type of the interface device comprising the device number "0" and the control unit determines whether the inquired interface device makes a response to the control unit based on the second type communication protocol;
    wherein if the inquired interface device makes the response, the inquired interface device is a second device type with the second type communication protocol, the device number "0" is recorded as the second device type with the second type communication protocol, and the device number "0" is added by one.

7. The communication system with serial ports of claim 6, wherein if the inquired interface device comprising the device number "0" makes no response to the control unit based on the second type communication protocol, the control unit inquires the device type of the interface device comprising the device number "0" and the control unit determines whether the inquired interface device makes a response to the control unit based on the third type communication protocol;

wherein if the inquired interface device makes the response, the inquired interface device is a third device type with the third type communication protocol, the device number "0" is recorded as the third device type with the third type communication protocol, and the device number "0" is added by one.

8. The communication system with serial ports of claim 7, wherein if the inquired interface device comprising the device number "0" makes no response to the control unit based on the third type communication protocol, the device number "0" is added by one.

9. The communication system with serial ports of claim 8, wherein when the device number is smaller than a predetermined number, the control unit inquires the device type of the interface device comprising a device number "1" based on the first type communication protocol and determines whether the inquired interface device makes a response to the control unit based on the first type communication protocol until the control unit inquires the device types and corresponding communication protocols of all the interface devices at different device numbers.

10. The communication system with serial ports of claim 9, wherein the interface devices with the first device type, the second device type and the third device type are selected from one group consisting of an analog-digital converter (ADC) interface device, a digital-analog converter (DAC) interface device, and a digital input/output device (DIO).

11. The communication system with serial ports of claim 1, wherein the calling parameter is selected from one group consisting of an I/O data length, an I/O flag mask, a shift value, a flag value and the combination.

12. A communication method with serial ports for automatically identifying device types and communication protocols, the communication method comprising the steps of:
(S1) controlling a serial port architecture to perform an initial driver function to initialize a plurality of interface devices by a control unit, wherein the serial port architecture comprises a first type communication protocol and a second type communication protocol parallel to the first type communication protocol, and the first type communication protocol is different from the second type communication protocol, the initialization step further comprising the steps:
(S11) inquiring a plurality of device types of the interface devices based on the second type communication protocol by the control unit, wherein each of the interface devices comprises a device number, a device type, and a communication protocol, and each of the interface devices corresponds to at least one driver function;
(S12) based on the device types, responding with information of the device type to the control unit according to the second type communication protocol by a type-identifying communication module of each interface device; and
(S13) based on the device types, establishing a mapping relationship table between the device numbers, the device types, and the communication protocols according to the second type communication protocol by the control unit, and the control unit stores the mapping relationship table therein;
(S2) transmitting a calling parameter of the device number to the control unit according to the first type communication protocol by the application program module coupled to the control unit; and
(S3) receiving the calling parameter based on the first type communication protocol and searching the device type, the communication protocol, and the driver function corresponding to the device number by the control unit so that the driver function of the interface device executes a data input/output (I/O) procedure to implement a serial communication procedure.

13. The communication method with serial ports of claim 12, wherein the control unit inquires the device type of the interface device by a device number "0" based on the first type communication protocol, and the control unit further determines whether the inquired interface device makes a response to the control unit based on the first type communication protocol;

wherein if the inquired interface device makes the response, the inquired interface device is a first device type with the first type communication protocol, the device number "0" is recorded as the first device type with the first type communication protocol, and the device number "0" is added by one.

14. The communication method with serial ports of claim 13, wherein during the steps (S11) and (S12), if the inquired interface device comprising the device number "0" makes no response to the control unit based on the first type communication protocol, the control unit inquires the device type of the interface device comprising the device number "0" and the control unit determines whether the inquired interface device makes a response to the control unit based on the second type communication protocol;

wherein if the inquired interface device makes the response, the inquired interface device is a second device type with the second type communication protocol, the device number "0" is recorded as the second device type with the second type communication protocol, and the device number "0" is added by one.

15. The communication method with serial ports of claim 14, wherein during the steps (S11) and (S12), if the inquired interface device comprising the device number "0" makes no response to the control unit based on the second type communication protocol, the control unit inquires the device type of the interface device comprising the device number "0" and the control unit determines whether the inquired interface device makes a response to the control unit based on the third type communication protocol;

wherein if the inquired interface device makes the response, the inquired interface device is a third device type with the third type communication protocol, the device number "0" is recorded as the third device type with the third type communication protocol, and the device number "0" is added by one.

16. The communication method with serial ports of claim 15, wherein during the steps (S11) and (S12), if the inquired interface device comprising the device number "0" makes no response to the control unit based on the third type communication protocol, the device number "0" is added by one.

17. The communication method with serial ports of claim 16, wherein during the steps (S11) and (S12), when the device number is smaller than a predetermined number, the control unit inquires the device type of the interface device comprising a device number "1" based on the first type communication protocol and determines whether the inquired interface device makes a response to the control unit based on the first type communication protocol until the control unit inquires the device types and corresponding communication protocols of all the interface devices at different device numbers.

18. The communication method with serial ports of claim 17, wherein the control unit further comprises a driver library coupled to the mapping relationship table, for storing the driver functions and the initial driver function in the driver library.

19. The communication method with serial ports of claim 18, wherein the first type communication protocol and the second type communication protocol are selected from one group consisting of Universal Asynchronous Receiver/Transmitter (UART) protocol, two-wire interface protocol, and two-wire interface protocol.

20. A computing device comprising a non-transitory computer-readable storage medium and a processor, wherein the non-transitory computer-readable storage medium stores therein at least one application program, the computing device executes the at least one application program using the processor, and the computing device performs a method comprising:
- (S1) controlling a serial port architecture to perform an initial driver function to initialize a plurality of interface devices by the processor, wherein the serial port architecture comprises a first type communication protocol and a second type communication protocol parallel to the first type communication protocol, and the first type communication protocol is different from the second type communication protocol, the initialization step further comprising the steps:
  - (S11) inquiring a plurality of device types of the interface devices based on the second type communication protocol by the processor, wherein each of the interface devices comprises a device number, a device type, and a communication protocol, and each of the interface devices corresponds to at least one driver function;
  - (S12) based on the device types, responding with information of the device type to the processor according to the second type communication protocol by a type-identifying communication module of each interface device; and
  - (S13) based on the device types, establishing a mapping relationship table between the device numbers, the device types, and the communication protocols according to the second type communication protocol by the processor, and the processor stores the mapping relationship table therein;
- (S2) transmitting a calling parameter of the device number to the processor according to the first type communication protocol by the application program module coupled to the processor; and
- (S3) receiving the calling parameter based on the first type communication protocol and searching the device type, the communication protocol, and the driver function corresponding to the device number by the processor so that the driver function of the interface device executes a data input/output (I/O) procedure to implement a serial communication procedure.

* * * * *